April 21, 1931.  C. E. MAYNARD  1,802,120
RUBBER TUBE AND METHOD OF AND APPARATUS FOR MAKING THE SAME
Filed March 1, 1927

INVENTOR.
BY Charles Edgar Maynard
Edward C. Taylor
ATTORNEY

Patented Apr. 21, 1931

1,802,120

UNITED STATES PATENT OFFICE

CHARLES EDGAR MAYNARD, OF NORTHAMPTON, MASSACHUSETTS, ASSIGNOR TO THE FISK RUBBER COMPANY, OF CHICOPEE FALLS, MASSACHUSETTS, A CORPORATION OF MASSACHUSETTS

RUBBER TUBE AND METHOD OF AND APPARATUS FOR MAKING THE SAME

Application filed March 1, 1927. Serial No. 171,357.

This invention relates to the making of rubber tubes particularly such as are intended for use as inner tubes for pneumatic tire casings. It has for its object the manufacture of tubes of improved quality at a reduction in manufacturing expense, particularly due to the omission of certain formerly standard operations such as the sealing of the ends of the tube to the mandrel, the removal of the sealing means and the skiving of the tube ends. It has for a further object the production of a skive or bevel on the end of the tube without cutting or molding. It has for a further object the production of tubes having improved tensile qualities due to the preservation of the inherent strength of the rubber during manufacture. It has for a further object the production of a tube having even thickness and constructed of a large number of laminations. It has for a further object the simultaneous making and vulcanization of a rubber tube.

This application is a continuation in part of my prior application Serial No. 129,955, filed August 18, 1926.

Referring to the drawings.

Figure 1:
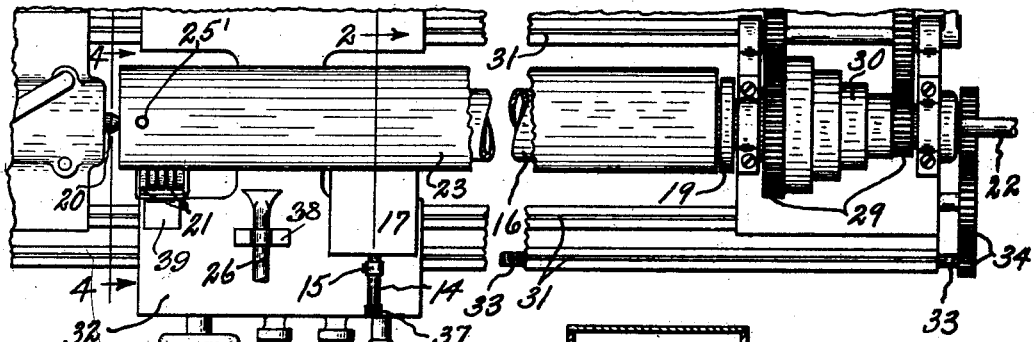
Fig. 1 is a top plan diagrammatic view showing an apparatus for forming a tube.

According to my improved method I spray latex, using the term in the sense as defined below, upon a heated mandrel, so that it coagulates or drys almost immediately after its application. Preferably the latex is sprayed against the mandrel in a helix running from one end of the mandrel to the other, although a plurality of shorter helices may be supplied to the mandrel by separate instrumentalities operating simultaneously if desired. After each layer is applied to the mandrel it is compactly and thoroughly pressed against the underlying layers as by the action of rollers following along after the spray.

The effect of this method as thus far described is to produce a tube having a plurality of concentric laminations, these laminations being preferably of membranous thickness and formed individually as a cohesive helix. Laminated tubes have long been recognized as superior on account of the added insurance against holes going all the way through. My tube differs, however, from prior laminated tubes in two respects. In the first place, the method formerly available for producing laminated tubes necessitated the use of laminations of great thickness compared to those of this method; so that only a few, generally four, laminations could be used in the complete tube. By my method I am enabled to use a very large number of laminations by reducing the thickness of each individual one, thereby greatly increasing the advantages above mentioned of the laminated structure.

In the manufacture of inner tubes it has formerly been the practise to bevel or skive the ends of the tube either during or after vulcanization. When done during vulcanization this skiving step has necessitated the use of special devices for molding the ends of the tube. When done after vulcanization the skiving has required the use of special machinery and separate operations involving considerable expense. By my method I avoid the expense and disadvantages of each of these two methods. Briefly stated I accomplish the result of obtaining a skived end on the tube by stepping off the successively applied laminations, preferably by making each successive lamination shorter than the one below it so that the end of the tube is formed on a bevel. Besides avoiding the necessity of applying compressive devices to mold the ends of the tube into a skive, my method attaches the tube to the mandrel so firmly that no external confining means are necessary during the vulcanization step.

Furthermore, according to the method of my invention I am able to perform the curing step at the same time that the tube is being built and thus avoid the necessity of separate operations in this regard. In order to accomplish this the mandrel upon which the tube is being formed is preferably heated to a point above the vulcanization temperature for the particular compound of rubber which is being used. Besides accomplishing the vulcanization of the rubber this temperature of the mandrel causes the latex to dry very quickly as it is applied to the mandrel and therefore greatly speed up the process of forming the tube. Besides heating the mandrel, I prefer to apply around the tube a jacket or other heating means so that heat may be applied by radiation to the outside of the partially or completely formed tube. This both assists in the drying of the latex and equalizes vulcanization in thick tubes, which might otherwise proceed more completely in the inner layers than in the outer. I have determined by actual experiment upon tubes made in accordance with my method that there is little or no difference in the degree of vulcanization imparted to the inside and to the outside of the tube.

For convenience in description I will use the term latex throughout the specification and claims but I wish to include within its scope other solutions or emulsions of rubber particularly such as artificial dispersions or such modified latices as result from concentration of the latex through the evaporation of water and the addition of suitable colloids such as soap, and also the addition of compounding material to the latex or dispersion. The use of these protective colloids is desirable as insuring stability and freedom from coagulation during spraying. It will be found possible through the use of my method to employ a greater percentage of compounding material in the rubber than has been possible by the use of prior methods and this may be found of considerable advantage both in increasing the physical properties of the tube and in decreasing the cost of the material which enters into it. It is also possible by the use of my method to employ in the rubber accelerators of such high power as to cause vulcanization at or near room temperatures. The use of such accelerators has been impossible in prior methods of tube building on account of the fact that their presence in the rubber would cause vulcanization during the standard operations of mixing, milling, and calendering.

Figures 2, 4:
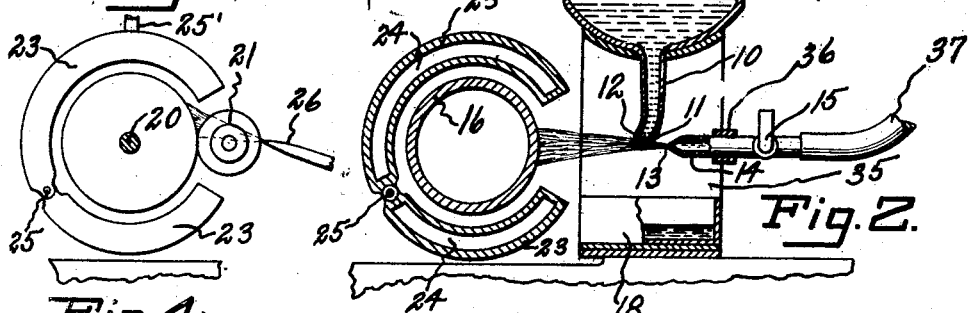
Fig. 2 is a sectional view thereof on line 2—2 of Fig. 1.
Fig. 4 is a detail section on line 4—4 of Fig. 1.

I will now proceed with the description of the specific illustrative examples shown in the drawing. Referring first to Fig. 2 I have shown a preferred form of nozzle for feeding the latex to the spray. This comprises the nozzle 10 having a tip 11 bent toward the work to be sprayed. A hole 12 is made in this tip on the side toward the work. When latex is allowed to flow down the nozzle 10 it passes out through the hole 12 and forms a film on the bottom of the nozzle. An air jet 13 is directed through a pipe 14 against the bottom of the nozzle and throws the film off in the form of a finely divided spray. The atomized latex is deposited upon the mandrel 16 in the form of finely divided particles of rubber together with a small content of water, which on account of the heat of the mandrel soon evaporates. The pipe 14 has a valve 15 in it by which the supply of air may be controlled. Nozzle 10 fits into a vessel 17 in which a constant level of latex is maintained in any desired or convenient manner. The latex is allowed to flow through the nozzle continuously irrespective of whether or not air is being admitted from pipe 14. If no air is passing the latex falls into a vessel 18 from which it may be returned to vessel 17 as by a pipe and pump which are not necessary to illustrate. The details of this preferred form of spray are fully set out in my copending application Serial No. 170,193 filed February 23, 1927. It is sufficient for the purposes of the present case to state that by permitting a consant flow of the latex drying and coagulating of the latex on the tip 11 when the air jet has been discontinued temporarily is avoided. Furthermore, the particular form of nozzle shown prevents the drying or coagulating in such a manner as to stop up the hole 12 in the nozzle. Since the hole in the present case is on that side of the nozzle remote from the air jet, no substantial drying action occurs at this point and therefore there is no tendency to clog.

The mandrel 16 is mounted upon centers 19 and 20 which support it and give it a rotation. During the rotation of the mandrel the jet or spray mechanism is advanced longitudinally of the mandrel so that the entire surface of the mandrel is covered beginning at one end and running to the other. The effect of this combined rotation and longitudinal movement is to apply to the mandrel a helical band of latex with successive layers overlapping thus forming a complete layer which is impervious and is intimately bonded together. Successive coats applied in this manner form concentric complete layers, each layer being bonded to the layers immediately adjacent and forming a homogeneous mass upon vulcanization. Since each layer may be of the thickness of a membrane only, a large number of layers are preferable for the completion of a tube and this gives a laminated structure of unusual freedom from porosity and structural defects.

The latex as coagulated from the spray is somewhat soft and it is necessary to compact the porous rubber in order to secure rubber of a uniform texture. This compacting is conveniently done by one or more rollers 21. A single wide roller can be used but I prefer the application of a plurality of narrower rollers each of which covers only a small band, the band covered by the successive rollers overlapping as the roller is advanced correspondingly with the rotation of the mandrel. The time of application of the pressure of the rollers 21 may vary somewhat but in practice it will be found that it is preferable to apply this pressure as soon as the rubber has coagulated sufficiently to stand it. If too short a period elapses the rubber will stick to the rollers, while if too long a period is allowed to elapse an imperfect bond with the underlying rubber will result, due, I believe, to the entrapment of water between the layers. The necessary period is sufficiently short to permit the use of a plurality of successive sprays and rollers following each other down the length of the mandrel.

Heat is preferably supplied to the mandrel through a pipe 22 leading steam directly into the mandrel's interior while the tube is being built up. A suitable swivel joint may be employed as will be well understood by those skilled in the art. Heat is preferably applied around the mandrel while the tube is being built up, by means of a two-part shield 23 formed as a hollow jacket 24 and hinged at 25 to permit the removal of the mandrel while permitting it to cover while in operation as great a part of the circumference of the mandrel as possible. Steam may be admitted into the jacket 24 by a suitable pipe connection 25' as will be well understood. In order to facilitate the drying of the latex upon the mandrel the action of the heat in the mandrel and the heat in the shield 23 may be supplemented by the jet of hot air issuing through a nozzle 26 and preferably directed slightly off the center of the mandrel. The use of this jet is not essential but is desirable in order to create a circulation of air between the mandrel and the shield and thus to speed the evaporation of water from the deposited latex. Additional speed can be obtained in drying by heating the air supplied through the jet 14, or by directing the sprayed latex through a zone of heated gas such as a flame.

Figure 3:
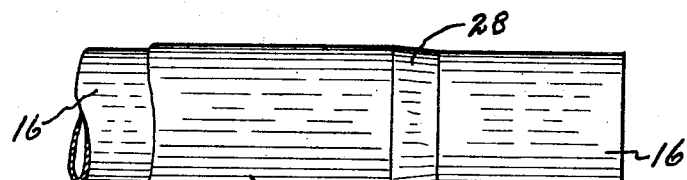
Fig. 3 is a detail of a tube produced by my improved method showing the tube still mounted on the mandrel.

In Figs. 1, 2, and 3, I have illustrated a simple apparatus for moving the spray and rollers and for rotating the mandrel in correct relationship to each other. In actual practice tubes have been built successfully upon a mandrel mounted in an ordinary engine lathe with the spray supported on the lathe carriage. The illustrated apparatus is of a similar type. The head 19, which receives one end of the mandrel and supplies steam thereto, is driven by gears 29 and pulleys 30 as in the usual head stock of a lathe. Ways 31 in the lathe bed support a carriage 32 driven longitudinally by means of a screw 33 which is geared at 34 to the gearing 29.

The carriage is thus caused to move along the mandrel at a rate in definite relation to the speed with which the mandrel rotates. Upon the carriage is mounted the bracket 35 carrying the receptacles 17 and 18. A sub-bracket 36 on bracket 35 supports the air line 14 in definite relation to the tip 11, a flexible tube 37 supplying air to pipe 14 so as not to interfere with its longitudinal movement. A bracket 38 supports nozzle 26 and a bracket 39 the rolls 21, all of these parts, therefore, following the spray along the mandrel in definite timed relation. Instead of mounting the rolls 21 so as to follow the spray along the mandrel they may be mounted so as to precede it, acting in this case upon the lamination which has just been completed instead of the one being laid on and giving additional time for drying.

The operation of the simple apparatus described above should be clear without much further description. Starting from one end of the mandrel the air jet 13 carries a stream of atomized latex against the mandrel in a helical band extending progressively from one end of the mandrel to the other. Practically as soon as this latex strikes the mandrel the water content is evaporated by the combined heat of the mandrel and the heat supplied by radiation from the shield 23. The pitch of the helix is sufficiently small so that successive turns overlap to some extent and thus a homogeneous layer is formed upon the mandrel. After the coagulation of the latex, the rollers 21 act upon the coagulated latex to thoroughly compress it in a path running helically from one end of the mandrel to the other, and, in the case of subsequently applied layers, unite them firmly to the layers underneath. In order to form a bevel or skive at the ends of the tube, the travel of the spraying mechanism is made successively shorter in successive layers, so that a bevel 28 is formed on the end of the tube 27 as clearly shown in Fig. 3.

The application of the latex from one end of the mandrel to the other by a single instrumentality (whether this be composed of one or of several spraying units) is of considerable advantage. In the first place, the covering of the whole mandrel surface with a single spraying means results in a coat of uniform thickness from one end of the mandrel to the other; while the use of a series of sprays sufficient in number to cover the entire length of the mandrel simultaneously would result inevitably in inequalities in the coat due to variations in the action of the different sprays. In the second place, the use of a spraying instrumentality passing from one end of the mandrel to the other permits the compacting device to be displaced axially from the spray, and to follow (or to precede) the spray along the mandrel. This allows the use of mandrels small enough to produce inner tubes while allowing space between the spray and compacting means for drying to occur.

Figure 5:
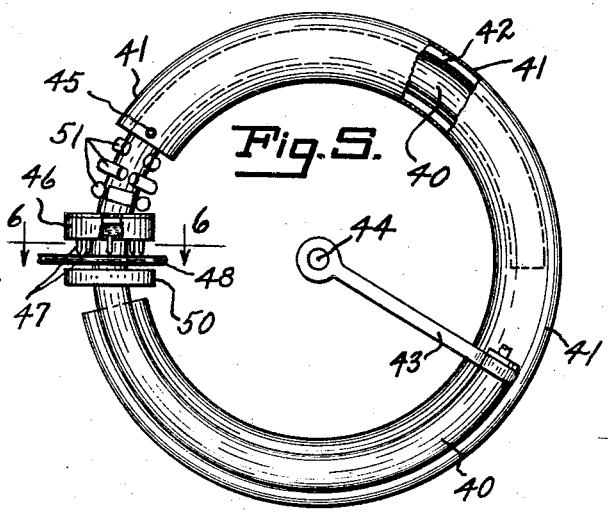
Fig. 5 is a side elevation of a modification.
Figure 6:
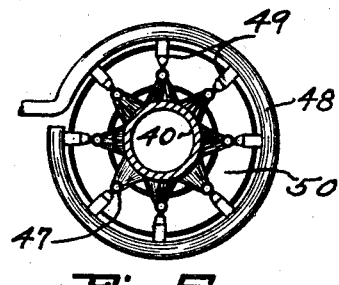
Fig. 6 is a detail thereof on line 6—6 of Fig. 5.

In Figs. 5 and 6 I have shown a modification of the apparatus to permit the use of the circular mandrels which are now preferred for the larger sizes of tubes. In this case, instead of the straight mandrel 16, I have shown a mandrel 40 formed on a spiral as is well known and fitting into a casing 41 suitably heated by a chamber 42, the casing being formed on a spiral corresponding to the spiral of the mandrel. An arm 43 pivoted at 44 supports the end of the mandrel and permits it to be fed into and out of the spiral casing, the mandrel threading into the casing in a manner similar to a screw. A pipe 45 leads into the chamber 42 for the supply of steam.

In the path of the mandrel is an annular vessel 46 having depending nozzles 47 which are similar in construction to the nozzle 10 above described. The holes in these nozzles 47 all point toward the center of the annulus. An annular pipe 48 lies around the nozzle and carries jets 49 (Fig. 6) which point against the bottom of the nozzles 47. A second vessel 50 lying under the nozzles 47 performs the same function as the vessel 18 described above. At a point beyond where the latex is sprayed onto the mandrel there are located a plurality of rollers 51 which compact the deposited rubber.

Having thus described my invention, I claim:

1. A rubber inner tube of uniform wall thickness composed of a plurality of homogeneous concentric laminations and having its ends formed on a bevel by the progressive shortening of successive laminations.

2. A rubber inner tube of uniform wall thickness composed of a plurality of homogeneous concentric laminations and having its ends formed on a bevel by stepping off.

3. A rubber inner tube composed of a plurality of concentric laminations, each lamination being formed as a homogeneous helix.

4. A method of making a rubber inner tube which comprises building up the tube in a plurality of layers of film thickness, each layer being formed as a cohesive helix, and compacting the helices after they are formed.

5. A method of making a rubber inner tube which comprises the steps of building up the tube in a plurality of concentric laminations, successive laminations being of different length to provide a beveled end on the tube.

6. A method of making a rubber inner tube which comprises the steps of building up the tube in a plurality of concentric discontinuous laminations, successive laminations being of different length to provide a beveled end on the tube, and integrating the laminations by vulcanization.

7. A method of making a rubber inner tube which comprises the steps of spraying latex upon a hot mandrel in a helical path, compacting the rubber when coagulation occurs, and repeating the spraying and compacting operations until the desired thickness has been attained.

8. A method of making a rubber inner tube which comprises spraying a succession of helical bands of latex upon a heated mandrel and compacting the deposited rubber after the application of each band.

9. A method of making a rubber inner tube which comprises spraying latex onto a heated mandrel in a large number of layers of membranous thickness, varying the length of successive layers so as to produce a beveled end on the tube, compacting the layers as they are formed, and vulcanizing the tube upon the mandrel in the condition in which it is thus formed, whereby the application of end sealing or beveling devices or the use of exterior confining means is avoided and a tube produced complete and ready for splicing.

10. A method of making a rubber inner tube which comprises spraying successive helical bands of latex against a heated mandrel and compacting in spaced overlapping helices the layers thus formed after their application and before the deposition of the next.

11. A method of making a rubber inner tube which comprises spraying coats of latex from one end of a mandrel progressively to the other.

12. A method of making a rubber inner tube which comprises spraying succesive coats of latex progressively from one end of a heated mandrel to the other, and compacting the deposited material progressively from one end of the mandrel to the other between the application of successive coats.

13. A method of making a rubber inner tube which comprises spraying latex upon a mandrel and compacting the deposited material in a plurality of narrow bands.

14. A method of making a rubber inner tube which comprises spraying latex progressively from one end of a mandrel to the other, and following the application and consequent coagulation of the latex compacting it in a plurality of narrow overlapping bands.

15. An apparatus for making rubber inner tubes comprising a mandrel, means for heating the mandrel, means for rotating the mandrel, a device for spraying latex against the mandrel, means for compacting the deposited rubber on the mandrel, and means for causing the spraying device and the compacting means to travel axially of the mandrel in timed relation to the rotation of the mandrel.

CHARLES EDGAR MAYNARD.